(12) United States Patent
Ushakov

(10) Patent No.: US 9,866,792 B2
(45) Date of Patent: Jan. 9, 2018

(54) DISPLAY APPARATUS AND ECHO CANCELLATION METHOD THEREOF

(71) Applicant: SAMSUNG ELECTRONICS CO., LTD., Suwon-si (KR)

(72) Inventor: Yury Vladimirovich Ushakov, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 50 days.

(21) Appl. No.: 14/977,765

(22) Filed: Dec. 22, 2015

(65) Prior Publication Data
US 2016/0182770 A1    Jun. 23, 2016

(30) Foreign Application Priority Data

Dec. 22, 2014  (KR) .......................... 10-2014-0185742

(51) Int. Cl.
| | |
|---|---|
| *H04N 5/217* | (2011.01) |
| *H04N 7/15* | (2006.01) |
| *H04R 3/02* | (2006.01) |
| *G10L 21/0208* | (2013.01) |
| *H04N 7/14* | (2006.01) |

(52) U.S. Cl.
CPC .......... *H04N 7/15* (2013.01); *G10L 21/0208* (2013.01); *H04R 3/02* (2013.01); *G10L 2021/02082* (2013.01); *H04N 7/147* (2013.01)

(58) Field of Classification Search
USPC ....... 348/241, 470, 533, 535, 606, 607, 683, 348/E5.084; 379/3, 406.01, 406.05, 379/22.08, 392.01
See application file for complete search history.

(56) References Cited

U.S. PATENT DOCUMENTS

| | | | |
|---|---|---|---|
| 5,937,060 A | 8/1999 | Oh | |
| 6,377,637 B1* | 4/2002 | Berdugo | ............. G10L 19/0208 375/285 |
| 2006/0222172 A1 | 10/2006 | Chhetri et al. | |
| 2011/0013781 A1* | 1/2011 | Chhetri | ................. H04M 9/082 381/66 |

OTHER PUBLICATIONS

Seung Yeol Lee and Nam Soo Kim, "A Statistical Model-Based Residual Echo Suppression", IEEE Signal Processing Letters, vol. 14, No. 10, Oct. 2007, pp. 758-761.

(Continued)

*Primary Examiner* — Yosef K Laekemariam
(74) *Attorney, Agent, or Firm* — Sughrue Mion, PLLC

(57) ABSTRACT

A display apparatus is provided. The display apparatus includes a display, a video receiver, and a processor. The display is configured to display an image. The video receiver is configured to receive an input signal of an impulse response. The processor configured to divide the input signal into sub-bands, apply primary echo-cancellation to the input signal by using sub-band signals corresponding to the sub-bands, estimate a residual echo based on acoustic echo path information obtained in the primary echo-cancellation with regard to each of the sub-bands, and perform secondary echo-cancellation to remove the estimated residual echo from the primary-echo-canceled input signal.

17 Claims, 6 Drawing Sheets

(56) References Cited

OTHER PUBLICATIONS

Jacob Benesty et al., "A Better Understanding and an Improved Solution to the Specific Problems of Stereophonic Acoustic Echo Cancellation", IEEE Transactions on Speech and Audio Processing, vol. 6, No. 2, Mar. 1998, pp. 156-165.

Jacob Benesty et al., "A New Class of Doubletalk Detectors Based on Cross-Correlation", IEEE Transactions on Speech and Audio Processing, vol. 8, No. 2, Mar. 2000, pp. 168-172.

Hun Choi and Hyeon-Deok Bae, "Subband Affine Projection Algorithm for Acoustic Echo Cancellation System", Hindawi Publishing Corporation, EURASIP Journal on Advances in Signal Processing, vol. 2007, Article ID 75621, 12 pages, doi:10.1155/2007/75621.

Israel Cohen et al., "Speech enhancement for non-stationary noise environments", Elsevier, Signal Processing 81 (2001) pp. 2403-2418, http://www.elsevier.com/locate/sigpro.

Emanuël A. P. Habets et al., "Joint Dereverberation and Residual Echo Suppression of Speech Signals in Noisy Environments", IEEE Transactions on Audio, Speech, and Language Processing, vol. 16, No. 8, Nov. 2008, pp. 1433-1451.

P. P. Vaidyanathan, "Multirate digital filters, filter banks, polyphase networks, and applications: a tutorial", Proceedings of the IEEE, vol. 78, No. 1, Jan. 1990, pp. 56-93.

\* cited by examiner

DISPLAY APPARATUS AND ECHO CANCELLATION METHOD THEREOF

CROSS-REFERENCE TO RELATED APPLICATION

This application claims priority from Korean Patent Application No. 10-2014-0185742, filed on Dec. 22, 2014 in the Korean Intellectual Property Office, the disclosure of which is incorporated herein by reference.

BACKGROUND

Field

Apparatuses and methods consistent with exemplary embodiments relate to a display apparatus and an echo cancellation method thereof, and more particularly to a display apparatus which can suppress a residual echo and an echo cancellation method thereof.

Description of the Related Art

A display apparatus such as a television (TV), a portable apparatus such as a mobile terminal, or a similar electronic apparatus can support functions such as voice recognition for recognizing a user's voice to control a device, a video call or video conference using a user's voice, etc. and a use range of these functions based on a voice have been gradually extended. The apparatus supporting such functions uses a microphone to receive a voice signal, and the received voice signal may include an echo.

The echo is results from a sound wave propagating from a sound source and reflecting off an object. Such an echo is easy to hear in daily life, and there is a sound reverberating from a mountain as an example of a simple echo based on a single reflection.

In contrast with the echo, there is a direct sound. The direct sound refers to a sound that is heard directly without being reflected off an object. Hence, the echo is a reflection of sound arriving a predetermined time after the direct sound.

In general, a sound made inside a structure with reflective surfaces, such as a room where a TV is installed, is reflected many times and becomes complex since directions of reflected sounds are all different. This is an example of multiple echoes, and is one of causes of a residual echo. For instance, the residual echo may be caused when a sound output from a speaker is reflected many times and then returned to a microphone.

If an echo and a residual echo are not properly canceled from an input voice signal, it may inconvenience a user who is using a corresponding function and may cause an error in operation. For a normal operation, not only the echo but also the residual echo has to be canceled from the voice signal.

However, the existing cancellation for the echo or the residual echo becomes a burden to an apparatus in light of a processing time or load since the existing cancellation generally needs complicated calculations, and has a disadvantage that the residual echo is not effectively canceled.

SUMMARY

According to an aspect of an exemplary embodiment, there is provided a display apparatus including a display configured to display an image; a video receiver configured to receive an input signal of an impulse response; and at least one processor configured to divide the input signal into a plurality of sub-bands, apply primary echo-cancellation to the input signal by using a plurality of sub-band signals corresponding to the plurality of sub-bands, estimate a residual echo based on acoustic echo path information obtained in the primary echo-cancellation with regard to each of the plurality of sub-bands, and perform secondary echo-cancellation to remove the estimated residual echo from the primary-echo-canceled input signal.

The at least one processor may include an acoustic echo canceler that performs the primary echo-cancellation to obtain the acoustic echo path information, and a residual echo suppressor that performs the secondary echo-cancellation based on the acoustic echo path information obtained by the acoustic echo canceler.

The acoustic echo canceller may estimate the acoustic echo path information for each of the sub-bands, and the residual echo suppressor may determine a decaying coefficient of an impulse response corresponding to each of the plurality of sub-bands, which has experienced the primary echo-cancellation, based on the estimated acoustic echo path information for the sub-bands.

The residual echo suppressor may determine a maximum of the impulse response and a local maximum at a decaying tail of the impulse response for each sub-band, and determine the decaying coefficient based on the determined maximum and local maximum.

The residual echo suppressor may determine the maximum and local maximum for each sub-band by dividing the impulse response corresponding to each sub-band into a plurality of search windows and updating the maximum or the local maximum while increasing an index with regard to each divided search window.

The residual echo suppressor may skip a procedure for determining the local maximum in a corresponding search window if the maximum is determined in a beginning of the impulse response, and update the local maximum in a next search window.

The decaying coefficient may be determined by $\rho_b = f_{sb} \cdot \ln(H_{max}/\text{Max}_1)/(i_1 - i_{max})$, where, $H_{max}$ denotes a maximum of the impulse response, $i_{max}$ denotes an index of $H_{max}$, $\text{Max}_1$ denotes an ultimately updated local maximum, $i_1$ denotes an index of the local maximum, and $f_{sb}$ denotes a sampling frequency due to down-sampling of the impulse response.

The residual echo suppressor may estimate initial power in a final residual echo section of the impulse response corresponding to each of the plurality of sub-bands, which has experienced the primary echo-cancellation, based on the decaying coefficient.

The initial power in each of the plurality of sub-bands may be determined by $$c_b = \exp\left\{-\frac{2\rho_b N_w}{f_{sb}}\right\} \sum_{j=0}^{N_w-1} \hat{h}_b^2(L_b - N_w + j).$$

where, Cb denotes initial power, $\rho_b$ denotes a decaying coefficient of a sub-band impulse response, $L_b$ denotes a length of the sub-band impulse response, $N_w$ denotes a length of a decaying tail of the sub-band impulse response, $f_{sb}$ denotes a sampling frequency due to a down-sampling of an impulse response, and $\hat{h}_b(n)$ denotes the sub-band impulse response.

The residual echo suppressor may estimate an acoustic echo path by applying adaptive filtration to each of the plurality of sub-bands, estimate an echo by convolving the estimated acoustic echo path for the sub-bands with a speaker signal, and remove a full-band echo signal synthesized with an echo estimated for the sub-bands from the input signal.

According to an aspect of another exemplary embodiment, there is provided an echo cancellation method of a display apparatus, the method including receiving an input signal of an impulse response; dividing the input signal into a plurality of sub-bands, and applying primary echo-cancellation to the input signal by using a plurality of sub-band signals corresponding to the plurality of sub-bands; and estimating a residual echo based on acoustic echo path information obtained in the primary echo-cancellation with regard to each of the plurality of sub-bands, and performing secondary echo-cancellation to remove the estimated residual echo from the primary-echo-canceled input signal.

The applying the primary echo-cancellation to the input signal may include estimating acoustic echo path information for each of the plurality of sub-bands, and the performing the secondary echo-cancellation may include determining a decaying coefficient of an impulse response corresponding to each of the plurality of sub-bands, which has experienced the primary echo-cancellation, based on the estimated acoustic echo path information for the sub-bands.

The performing the secondary echo-cancellation may include determining a maximum of the impulse response and a local maximum at a decaying tail of the impulse response for each sub-band, and determining the decaying coefficient based on the determined maximum and local maximum.

The maximum and local maximum may be determined for each sub-band by dividing the impulse response corresponding to each sub-band into a plurality of search windows and updating the maximum or the local maximum while increasing an index with regard to each divided search window.

The performing the secondary echo-cancellation may include skipping a procedure for determining the local maximum in a corresponding search window if the maximum is determined in a beginning of the impulse response; and updating the local maximum in a next search window.

The decaying coefficient may be determined by $\rho_b = f_{sb} \cdot \ln(H_{max}/Max_1)/(i_1 - i_{max})$, where, $H_{max}$ denotes a maximum of the impulse response, $i_{max}$ denotes an index of $H_{max}$, $Max_1$ denotes an ultimately updated local maximum, $i_1$ denotes an index of the local maximum, and $f_{sb}$ denotes a sampling frequency due to down-sampling of the impulse response.

The performing the secondary echo-cancellation may include estimating initial power in a final residual echo section of the impulse response corresponding to each of the plurality of sub-bands, which has experienced the primary echo-cancellation, based on the decaying coefficient.

The initial power in each of the plurality of sub-bands may be determined by $$c_b = \exp\left\{-\frac{2\rho_b N_w}{f_{sb}}\right\} \sum_{j=0}^{N_w-1} \hat{h}_b^2(L_b - N_w + j).$$

where, $C_b$ denotes initial power, $\rho_b$ denotes a decaying coefficient of a sub-band impulse response, $L_b$ denotes a length of the sub-band impulse response, $N_w$ denotes a length of a decaying tail of the sub-band impulse response, $f_{sb}$ denotes a sampling frequency due to a down-sampling of the impulse response, and $\hat{h}_b(n)$ denotes the sub-band impulse response.

The applying the primary echo-cancellation may include estimating an acoustic echo path by applying adaptive filtration to each of the plurality of sub-bands; estimating an echo by convolving the estimated acoustic echo path for the sub-bands with a speaker signal; and removing a full-band echo signal synthesized with an echo estimated for the sub-bands from the input signal.

According to an aspect of another exemplary embodiment, there is provided an echo cancellation device including at least one processor configured to perform primary echo-cancellation on an input signal by dividing the input signal into a plurality of side-bands, removing a primary echo from each of the plurality of side-bands to produce a primary-echo-cancelled signal for each side-band, and estimating a residual echo for each of the primary-echo-cancelled signals; and at least one processor configured to perform residual echo-cancellation by generating a full-band residual echo signal from the estimated residual echoes for each side-band, and remove the full-band residual echo signal from a signal on which the primary echo-cancellation has been performed.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Hereinafter, exemplary embodiments will be described in detail with reference to accompanying drawings so as to be easily materialized by a person having an ordinary skill in the art. The inventive concept may be embodied in various forms and is not limited to the following exemplary embodiments. For convenience of description, parts not directly related to the present disclosure are omitted, and like numerals refer to like elements throughout.

Figure 1:
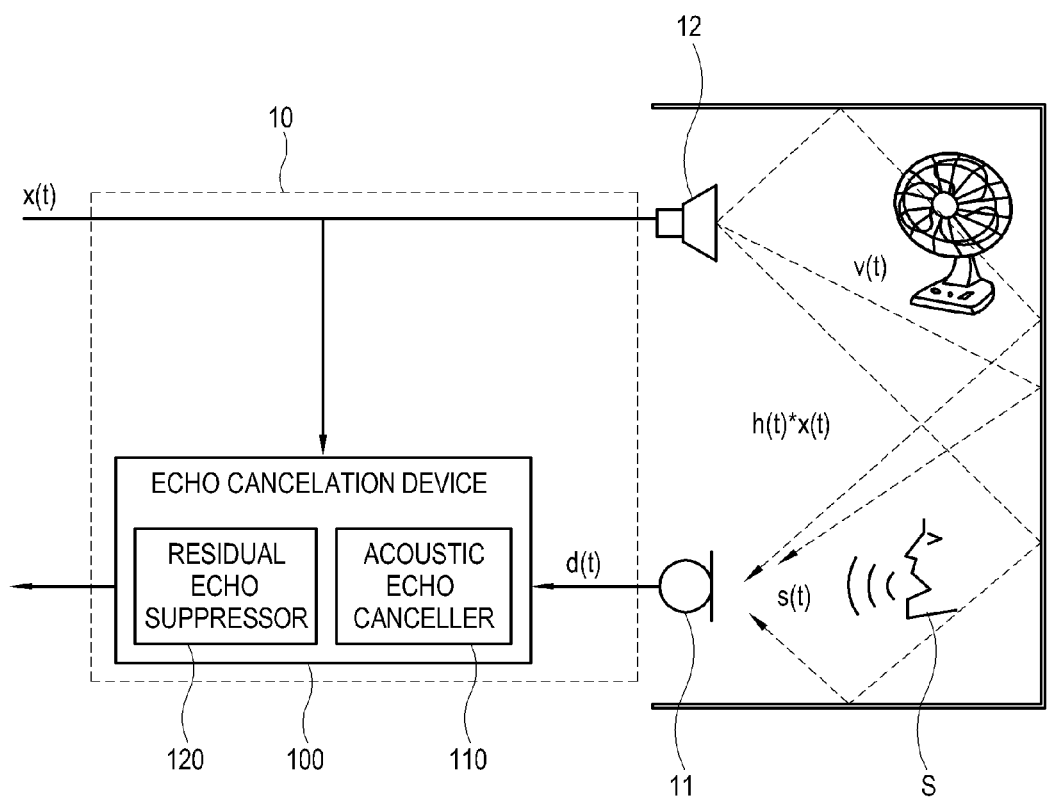
FIG. 1 is a block diagram of an echo cancelation device provided in an electronic apparatus according to an exemplary embodiment.

FIG. 1 is a block diagram of an echo cancelation device provided in an electronic apparatus according to an exemplary embodiment;

As shown in FIG. 1, an electronic apparatus 10 according to an exemplary embodiment may include a voice receiver 11 for receiving a voice signal of a voice of a person S, a sound output 12 for outputting a voice signal, and an echo cancelation device 100 for canceling an echo from the received voice signal. While a voice signal of the voice of the person is described, it will be understood that a sound signal of a sound other than a voice may be received and an echo cancelled from the received sound signal.

The voice receiver 11 may include a microphone to receive an input signal, and the sound output 12 may include a speaker to output an output signal.

The echo cancelation device 100 includes at least one processor. As shown in FIG. 1, the echo cancelation device 100 may for example include an acoustic echo canceler (AEC) 110 as a processor for first echo cancellation (as a first processor), and a residual echo suppressor (RES) 120 as another processor for second echo cancellation (as a second processor).

The at least one processor may load a relevant program from a nonvolatile memory (e.g., a read only memory, ROM), where programs are stored, to a volatile memory (e.g., a random access memory, RAM) and execute the loaded program.

The at least one processor may be implemented by combination between a program for implementing at least one algorithm (to be described later) and a chip, for example, an integrated chip (IC) provided as a dedicated processor for executing the program.

For example, according to an exemplary embodiment, the acoustic echo canceler 110 and the residual echo suppressor 120 may be implemented by two chips that operate based on their corresponding algorithms, respectively, or both the acoustic echo canceler 110 and the residual echo suppressor 120 may be implemented by a single chip. In the case where both the acoustic echo canceler 110 and the residual echo suppressor 120 are provided as the single chip, one processor may operate to run a program for the first echo cancellation and a program for the second echo cancellation.

According to an exemplary embodiment, the echo cancelation device 100 may be include a central processing unit (CPU), an application processor (AP), a microcomputer (MICOM), or the like. Alternatively, the echo cancelation device 100 may be implemented by a general-purpose processor so that the single processor may, for example, load a program corresponding to an algorithm stored in the ROM to the RAM and execute the loaded program in order to, for example, independently perform the first echo cancellation and the second echo cancellation. That is, one processor operates to run both the program for the first echo cancellation and the program for the second echo cancellation.

For instance, if the echo cancelation device 100 is implemented by the CPU, the CPU may perform not only the acoustic echo cancellation but also various functions supported in the electronic apparatus 10, for example, control over various image processing processes such as decoding, demodulating, scaling, etc. with regard to an image displayed on a display; response to a command received from a user input including a remote controller; control over wired/wireless network communication; etc. The functions supported by the processor may include control operations corresponding to voice recognition for recognizing a voice signal from which an echo is canceled according to an exemplary embodiment (for example, channel change, volume control, etc. in a TV), or operations for a video call (for example, making a caller image input through a video receiver, e.g. a camera and an image of the other party received through a communicator be displayed on a screen; transmitting a caller' voice signal input through the voice receiver 11, from which an echo is canceled, to the other party; and outputting a voice signal received from the other party to the sound output 12.

In this exemplary embodiment, the electronic apparatus 10 is a display apparatus such as a TV or a set-top box. The display apparatus uses an image processing process to process an image signal provided from at least one external image source such as a broadcasting station to be displayed as an image on the display. The image processing process may be preset.

This exemplary embodiment relates to a display apparatus such as a TV for displaying a broadcast image based on a broadcast signal/broadcast information/broadcast data received from a transmitter of a broadcasting station. However, the kind of images displayable by the display apparatus is not limited to the broadcast image. Alternatively, the display apparatus may for example display a moving image, a still image, an application, an on-screen display (OSD), a user interface (UI, hereinafter also referred to as a graphic user interface (GUI)), etc. based on a signal/data received from various image sources.

According to an exemplary embodiment, the display apparatus may be a smart TV or an Internet protocol (IP) TV. The smart TV is capable of receiving and displaying a broadcast signal in real time, and has a web-browsing function for searching and consuming various contents through Internet while displaying the broadcast signal in real time. To this end, the smart TV offers a convenient environment to a user. Further, the smart TV has an open software platform and thus provides interactive services to a user. Therefore, the smart TV can offer various contents, for example, an application of providing a predetermined service, to a user through the open software platform. Such an application is an application program capable of providing various kinds of service, which may for instance include applications for providing social network services (SNS), finance, news, weather, maps, music, movies, games, electronic books, etc.

The display apparatus according to an exemplary embodiment may provide an application for performing voice recognition and/or a video call. For the voice recognition, a voice recognition engine for applying the voice recognition to an input voice signal may be provided inside the display apparatus or outside the display apparatus (for example, in a cloud server).

The present inventive concept may be applied to another display apparatus, for example, a monitor connected to a computer, etc.

In addition, the electronic apparatus 10 according to an exemplary embodiment is not limited to a TV, i.e. a display apparatus. Specifically, the electronic apparatus 10 may be a portable apparatus such as a mobile terminal including a smart phone or the like cellular phone, a tablet personal computer (smart pad), a portable media player (MP3 player), a digital camera, a camcorder, etc. but is not limited thereto.

For a user's convenience, the portable apparatus such as the cellular phone may support a hands-free call using the microphone and the speaker provided separately from those in a handset. Such a hands-free function is applicable to the portable apparatus by various manners such as a hands-free phone for a vehicle, a teleconference system, a speakerphone system, etc. Further, the portable apparatus may also support the voice recognition and/or the video call and use an internal or external voice recognition engine for the voice recognition.

Accordingly, the echo cancelation device 100 provided in the electronic apparatus 10 according to an exemplary embodiment may be employed for canceling an echo from an input signal while performing the foregoing hands-free function as well as voice recognition and/or a video call.

Figure 2:
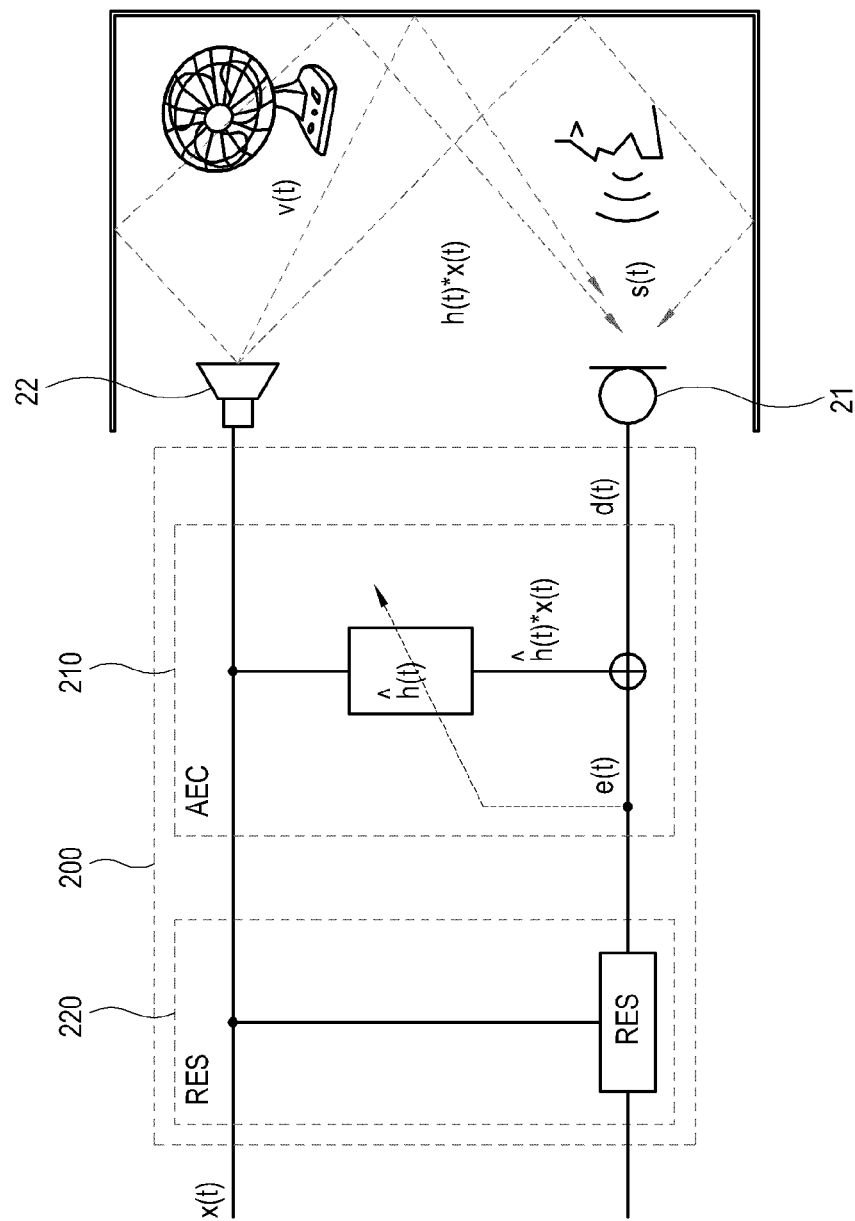
FIG. 2 is a block diagram schematically showing an echo cancelation device according to an exemplary embodiment.

FIG. 2 is a block diagram schematically showing an echo cancelation device according to an exemplary embodiment.

As shown in FIG. 2, in a telecommunication system using an electronic apparatus 200, a far-end speaker (i.e. far-end user) can hear his/her own voice (i.e. a reflected sound) delayed due to an acoustic path between a sound producing device and microphone 21 at a near-end. This reflected sound is referred to as an acoustic echo. To control the acoustic echo, acoustic echo cancellation is used.

Usually the acoustic echo is analyzed at the near-end, where a speaker and a microphone share the same acoustic environment. Echo cancellation in a real case is complicated by additional noise sources, for example, near-end speech s(t) or sounds v(t) produced by working devices. All these sounds are summed into a microphone signal d(t)=h(t)*x(t)+s(t)+v(t), where h(t)*x(t) denotes the acoustic echo, produced as the convolution of an acoustic echo path h(t) and a speaker signal x(t). The speaker signal x(t) is also referred to as a far-end speaker signal or a reference signal, and the microphone signal, i.e., the convolution of an input signal and an echo signal, is given in the form of an impulse response (IS).

Therefore, an acoustic echo canceller (AEC) 210 according to an exemplary embodiment operates to perform echo suppression on the input signal d(t) received in the microphone, while preserving at least the near-end speech s(t) corresponding to a user's direct sounds.

The operations of the acoustic echo canceler (AEC) 210 are based on a finite impulse response (FIR) adaptive filter (AF), which is adapting by a certain algorithm to the echo path h(t). For example, the acoustic echo canceler (AEC) 210 may operate to adjust a filter coefficient of the adaptive filter to thereby decrease an error between a real echo component and an echo signal estimated by an adaptive algorithm such as a normalized least mean square (NLMS) algorithm.

A path estimation ĥ(t) is then convolved with an available reference signal, i.e. the speaker signal x(t), and the convolution is subtracted from a microphone signal d(t).

The adaptive filter (AF) tries to filter a speaker signal in the same way that filtration is performed by a physical environment through which speaker oscillations propagate to a microphone 21. The result of the foregoing subtraction e(t) is used for filter adaptation. For an estimated echo path ĥ(t), in the absence of any additional noise including a near-end speech, e(t) tends to zero.

A limitation in performance of the acoustic echo canceler (AEC) 210 arises from the fact that a finite number of coefficients (taps) of an AF cannot fully estimate the real echo path h(t), which is theoretically infinite or, at least, contains significant values at a very long decaying tail. Another limitation is due to linearity of the finite impulse response adaptive filter (FIR AF), so that the finite impulse response adaptive filter (FIR AF) is unable to take nonlinear frequency components of echo into account.

Therefore, the error signal e(t) usually contains some residual echoes, which may be suppressed (i.e. secondary echo-cancellation) by a residual echo suppressor (RES) 220 shown in FIG. 2.

Typically, the residual echo suppressor (RES) 220 is related with speech enhancement for noisy environments. The residual echo suppressor (RES) 220 estimates a noise intensity λd in an input signal, and estimates a probability of speech presence p, and, given these two values, constructs an appropriate gain providing optimal speech amplification and noise suppression. These operations may be performed in a frequency domain for each short frame of a sound signal.

Thus, the residual echo suppressor (RES) 220 estimates a residual echo intensity λe in the error signal e(t) given the reference signal x(t) and the estimated echo path ĥ(t) from the acoustic echo canceler (AEC) 210. The residual echo is considered as an independent noise, and the intensity λe of the residual echo is used in the same manner as the foregoing noise intensity λd.

Since the residual echo suppressor (RES) 220 works in the frequency domain, each frame of the error signal e(n) is converted into the frequency domain by a discrete Fourier transform. Then the resulting value E(l, k), where l is a number of a frame and k is a frequency bin index, is processed by an algorithm for each k, for example, by a Wiener filter or an algorithm based on minimum mean square error (MMSE) estimation. The algorithm may be predetermined. For the error signal and other signals, a discrete variable n is used instead of a time variable t, because the processing is performed on discrete samples of digital signals.

The residual echo suppressor (RES) 220 may employ estimation procedures for the reverberation time T60(l, k) and initial power c(l, k) of the residual echo, and thus may have a disadvantage by having the computational complexity of λe(l, k) estimation.

Figure 3:
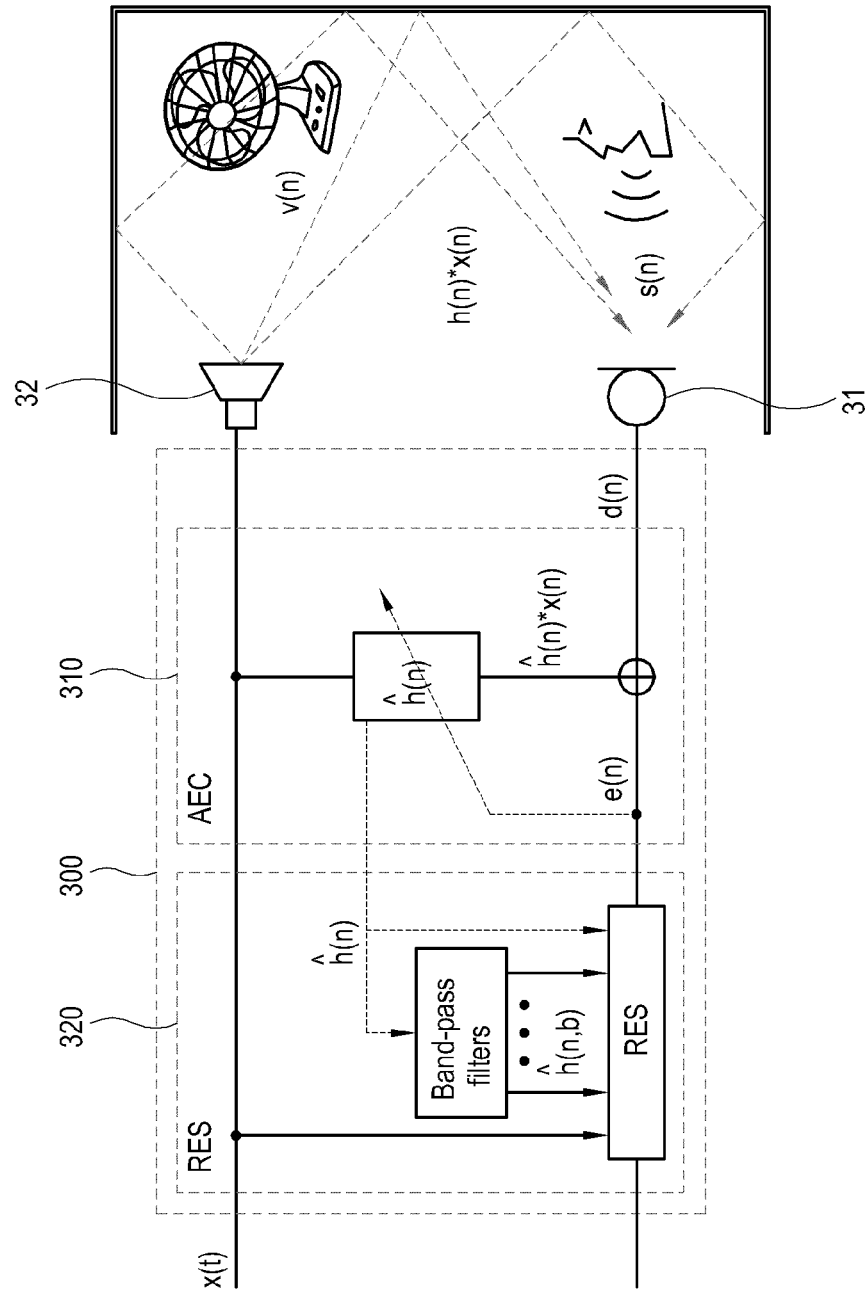
FIG. 3 is a block diagram showing an echo cancelation device that complements operations of a residual echo suppressor of the echo cancellation device of FIG. 2 according to an exemplary embodiment.

FIG. 3 is a block diagram showing an echo cancelation device that complements operations of the residual echo suppressor of FIG. 2 according to an exemplary embodiment.

In the exemplary embodiment shown in FIG. 3, in order to improve the computational complexity in the residual echo suppressor (RES) 220 of FIG. 2, the acoustic echo path ĥ(n) may be first filtered by a number of narrow band-pass filters (FIG. 2), and algorithms are then applied to resulting sub-band echo paths ĥ(n, b), where b denotes the sub-band number, as shown in FIG. 3.

Specifically, a number of points of an energy decay curve (EDC) for a sub-band impulse response may be calculated. Each point is calculated by the following Formula 1.

$$C_m = 20\log_{10}\left(\sum_{j=m}^{N-1} \hat{h}^2(j, b)\right),\quad \text{[Formula 1]}$$

for m=0, 1, ... N−1, where, N denotes a length of a corresponding sub-band echo path ĥ(n,b).

Then, linear approximation of a set of $C_m$ points is performed, which uses calculation of regression coefficients:

$$\sum_{j=m_s}^{m_e} C_j,\ \sum_{j=m_s}^{m_e} C_j^2,\ \sum_{j=m_s}^{m_e} jC_j \text{ and } \sum_{j=m_s}^{m_e} j,$$

where $m_s$ and $m_e$ denote start-time and end-time respectively, in sense of discrete time scale for ĥ(n,b) and its EDC. The foregoing operations are performed for each sub-band b.

In the residual echo suppressor (RES) 320 of FIG. 3, estimation of the initial power c(l, k) may be performed for each frequency index k in accordance with the following Formula 2.

$$c(l, k) = A(k) \left| \sum_{j=0}^{N_w-1} \hat{h}(N - N_w + j) \exp\left(-i\frac{2\pi k}{N_{DFT}} j\right) \right|^2 \quad \text{[Formula 2]}$$

Where, $A(k)$ denotes a certain coefficient depending on $T60(l, k)$, $N_w$ is a certain number of $\hat{h}(n)$ samples in its tail ($N_w < N$), $i = +\sqrt{-1}$, $N_{DFT}$ is a length of the used discrete Fourier transform.

The foregoing residual echo suppressor (RES) 320 of FIG. 3 reduces the computational complexity more than the residual echo suppressor (RES) 220 of FIG. 2. The computations of the residual echo suppressor (RES) 320 may become complicated in real-time systems for the acoustic echo cancellation.

Figure 4:
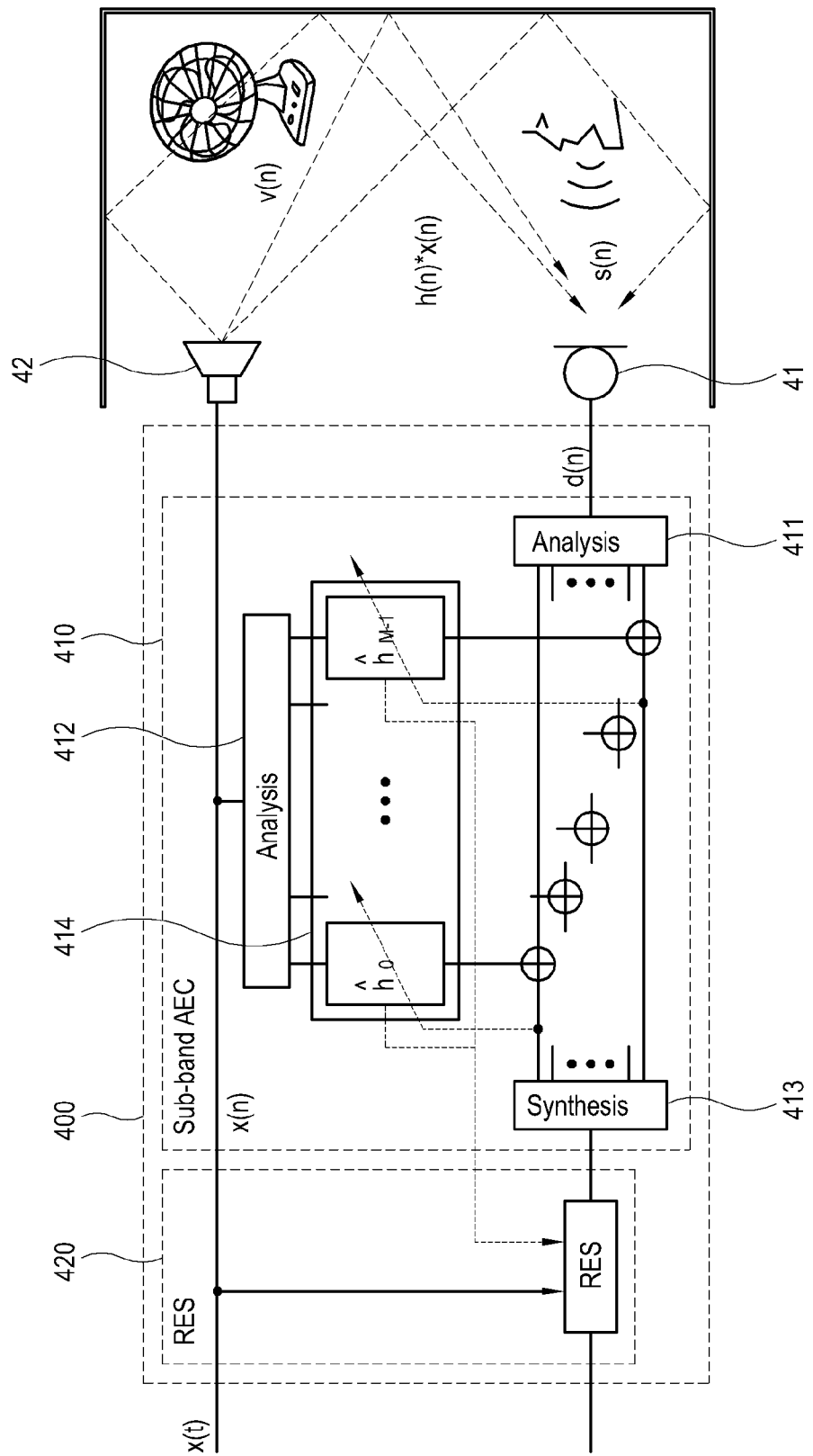
FIG. 4 is a block diagram showing an echo cancelation device that complements operations of the residual echo suppressors of the echo cancellation devices of FIG. 2 and FIG. 3 according to an exemplary embodiment.
Figure 5:
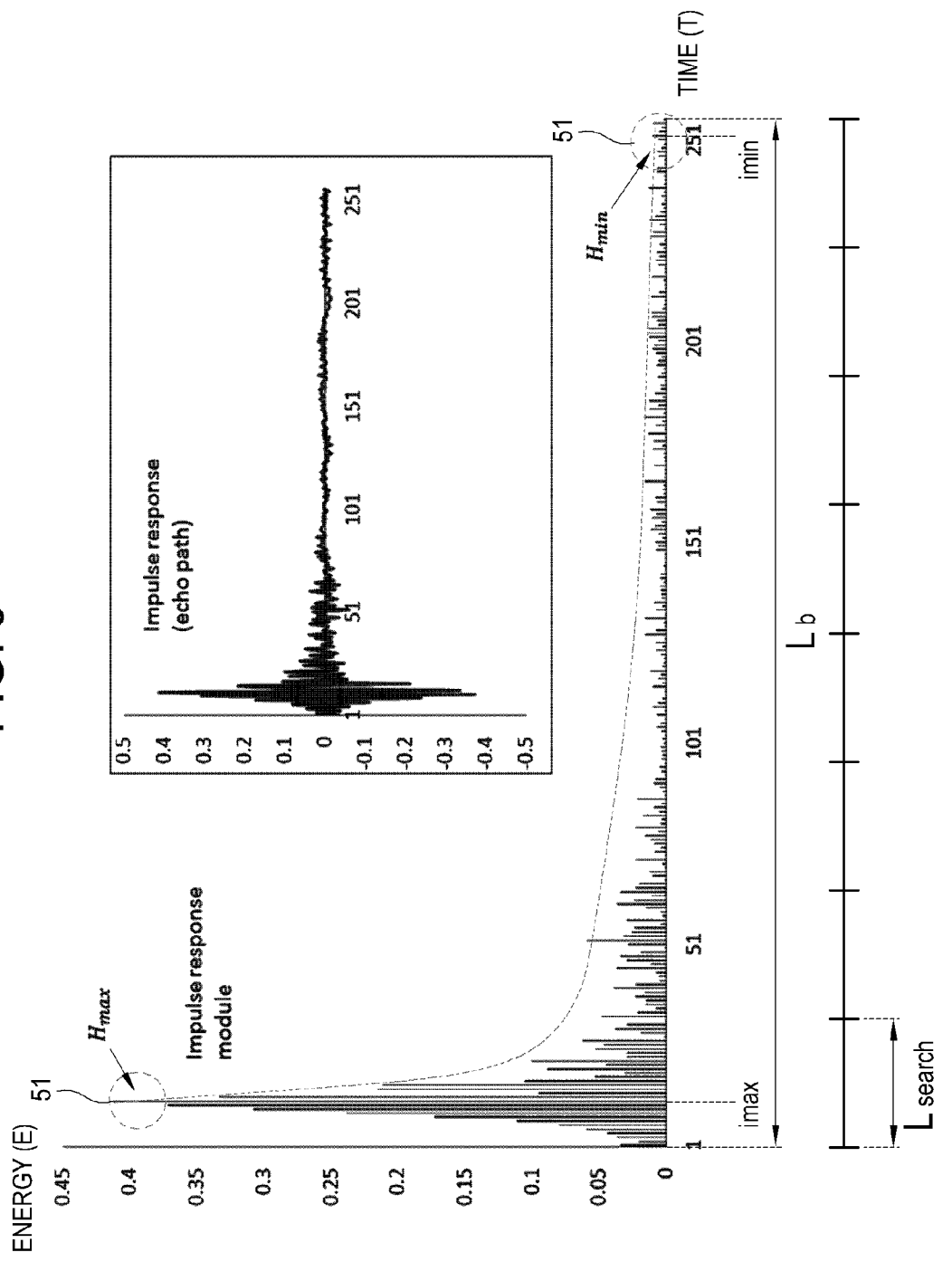
FIG. 5 is a view showing a waveform of an impulse response signal according to an exemplary embodiment.

FIG. 4 is a block diagram showing an echo cancelation device that complements operations of the residual echo suppressors of FIG. 2 and FIG. 3 according to an exemplary embodiment, and FIG. 5 is a view showing a waveform of an impulse response signal according to an exemplary embodiment.

The exemplary embodiment shown in FIG. 4 provides an apparatus and method of full-band residual echo suppression after a sub-band acoustic echo cancellation.

In a smart TV capable of supporting the voice recognition function, a voice command is input to a TV microphone simultaneously with surrounding noise, where a main source of the surrounding noise is a TV speaker playing a broadcast (i.e. a TV echo).

The voice recognition engine is susceptible to noise. Therefore, the smart TV or the like electronic apparatus supporting the voice recognition function seeks to remove the TV echo from an input signal received in the microphone as much as possible, while preserving voice commands to be analyzed for recognition.

An acoustic echo canceler (AEC) 410 may work in a double-talk scenario. For example, a near-end speech s(n) and a far-end speech x(t), are non-zero simultaneously. For example, the near-end speech s(n) may be a command. This scenario uses non-trivial adaptive algorithms for processing the microphone signal in real time.

The complexity of AEC filtration algorithms increases as L2 or at least L·log L, where L is a filter length.

For the adaptive filters, a long overlap between successive signal frames is only applicable to track rapid signal or environment changes, and it is therefore not so easy to gain from usage of frequency domain operations, which provide the L·log L complexity. Also, it may be difficult to reduce an adaptive filter length L in case of the AEC without output result degradation.

For this reason, sub-band AEC algorithms are popular in real-time systems.

Specifically, the acoustic echo canceler (AEC) 410 for the primary echo-cancellation divides an input signal of an impulse response into a plurality of sub-bands to generate a plurality of sub-frames, and applies adaptive filtering to each of the divided sub-bands (i.e. sub-frames) to estimate the acoustic echo path, thereby estimating an echo by convolution of the estimated acoustic echo path and the speaker signal. This convolution is performed with regard to each sub-band.

Thus, the echoes according to the sub-bands are summed into a full-band echo, and the primary echo-cancellation is performed in such a manner that the full-band echo is removed from the input signal.

In this exemplary embodiment, the acoustic echo canceler (AEC) 410 may include 16 sub-band AECs for generating 16 sub-frames. However, this is only an example. The number of sub-bands is not particularly limited, and the number of sub-bands may be greater than or less than 16.

The acoustic echo canceler (AEC) 410 applies primary echo-cancellation to each of the sub-bands included in the domain to be analyzed, in which the domain to be analyzed may be a section excluding a final residual echo section corresponding to a decaying tail of the impulse response and, for instance, may include a direct sound section and an initial reflected sound section.

The residual echo suppressor (RES) 420 for the secondary echo-cancellation estimates a residual echo of an input signal, i.e., an impulse response, based on information about the acoustic echo path obtained by the primary echo-cancellation with respect to each of the plural sub-bands (hereinafter, referred to as sub-frames), and performs the secondary echo-cancellation for removing the estimated residual echo from the input signal from which the echo is primarily removed. The residual echo suppressor (RES) 420 can estimate the residual echo in the final residual echo section corresponding to the decaying tail of the impulse response based on the information about the acoustic echo path estimated for each of the plural sub-bands of the domain (a) to be analyzed.

Since the input signal of the microphone is actually given in the form of an infinite impulse response, the residual echo in the final residual echo section corresponding to the infinite decaying tail (not shown) is estimated based on information estimated by the acoustic echo canceler (AEC) 410 about the acoustic echo path of the domain to be analyzed, thereby reducing the computational complexity in estimating and removing the residual echo in the impulse response of FIG. 5 to be described later.

As shown in FIG. 4, the acoustic echo canceler (AEC) 410 according to an exemplary embodiment includes a first sub-band generation module (Analysis) 411, a second sub-band generation module (Analysis) 412, a full-band synthesis module (Synthesis) 413, and an echo estimation module 414.

In the acoustic echo canceler (AEC) 410 of FIG. 4 as compared with that of FIG. 2 or 3, an adaptive filter in each sub-band can be quite short, at the same time preserving a value of a total length, which is a sum of sub-band lengths. However, even after the operation of the acoustic echo canceler (AEC) 410, a residual echo still remains in a microphone signal and therefore the operation of the residual echo suppressor (RES) 420 is used like those of FIGS. 2 and 3. Accordingly, the RES system is also suitable for echo suppression in the smart TV.

According to the exemplary embodiment shown in FIG. 4, the residual echo suppressor (RES) 420 is provided for the sub-band acoustic echo canceler (AEC) 410 and removes the residual echo. For the estimation of values by the residual echo suppressor (RES) 420, sub-band impulse responses are used. Thus, an efficient estimation algorithm may be suggested for these values.

In FIG. 4, the sub-band acoustic echo canceler (AEC) 410 receives the microphone signal (i.e. the input signal) d(n) as well as the speaker signal (i.e. the reference signal x(n)). The input signal d(n) is divided into sub-bands by the first sub-band generation module (Analysis) 411, and the reference signal x(n) is divided by into sub-bands by the second sub-band generation module (Analysis) 412, thereby generating a plurality of sub-bands (for example, M sub-bands).

In other words, the input signal d(n) and the reference signal x(n) are analyzed into sub-frames. The first and second sub-band generation modules (Analysis) 411 and 412 may include M band-pass filters and down-sampling units.

The echo estimation module 414 estimates the acoustic echo path by performing adaptive filtration in each sub-band based on the outputs from the first and second sub-band generation modules (Analysis) 411 and 412. Further, the echo estimation module 414 estimates the echo by convolving the estimated sub-band acoustic echo path with the speaker signal x(t) (i.e., the reference signal x(n)). Here, the adaptive algorithm, for example, the FIR AF described with reference to FIG. 2, may be used for the adaptive filtration.

The filtered signals of the sub-bands, that is, the estimated echoes are collected into the full-band signal by the full-band synthesis module (Synthesis) 412. The full-band synthesis module (Synthesis) 412 may include M up-sampling units and band-pass filters for preventing an imaging effect of up-sampling.

Then, an echo h(n)*x(n) estimated with respect to the full-band is primarily removed from the input signal, i.e. from the impulse response d(n).

During the operations of the AEC in the foregoing sub-bands, a set of impulse responses $\hat{h}_b(n)$ is estimated, where b=0, 1, . . . , M−1, and M is the number of sub-bands, i.e. sub-frames.

In this exemplary embodiment, as shown in FIG. 4 the residual echo suppressor 420 receives the impulse response $\hat{h}_b$ (n) of each sub-band estimated by the acoustic echo canceler 410, and uses the received impulse response to estimate the residual echo, thereby performing the secondary echo-cancellation to remove the estimated residual echo.

According to an exemplary embodiment, the residual echo suppressor 420 of FIG. 4 uses an exponential decay coefficient ρ(l, k) of the impulse response shown in FIG. 5. In FIG. 5, the horizontal axis (x axis) corresponds to the number of samples, i.e. time (T), the vertical axis (y axis) corresponds to energy (E), and a coefficient ρ(l, k) is connected with a reverberation time T60(l, k) as ρ(l, k)=3·ln 10/T60(l, k).

In this exemplary embodiment, the echo cancelation device 400 operates based on a $\rho_b(l)$ calculation algorithm (to be described later), and has a connection scheme between the sub-band acoustic echo canceler (AEC) 410 and the full-band residual echo suppressor (RES) 420 in order to get the sub-band decaying coefficient $\rho_b(l)$ from $\hat{h}_b$ (n) estimated corresponding to each sub-band as shown in FIG. 4.

Figure 6:
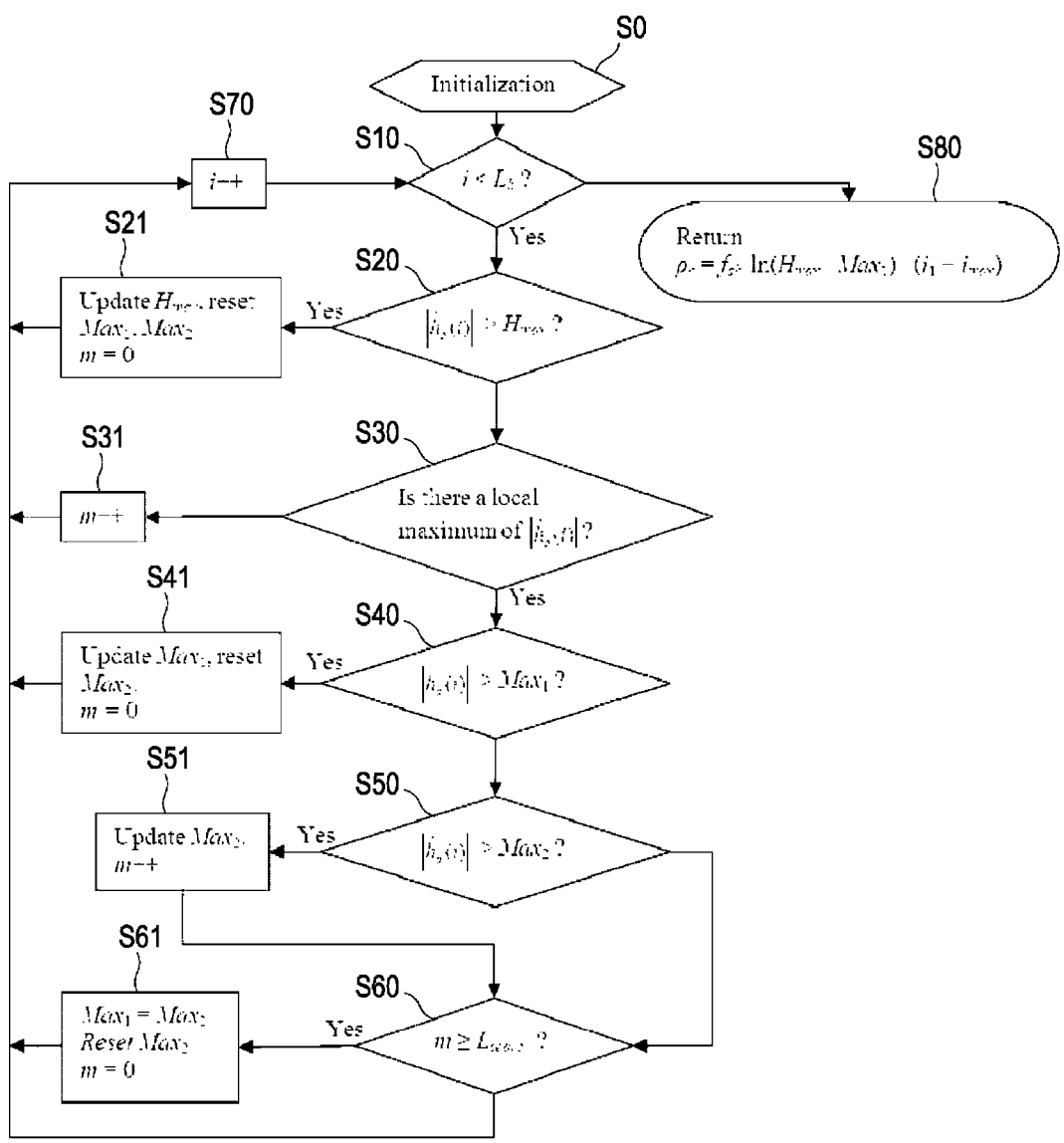
FIG. 6 is a flowchart showing operations based on an algorithm for estimating a sub-band impulse response decaying coefficient according to an exemplary embodiment.

FIG. 6 is a flowchart showing operations based on an algorithm for estimating a sub-band impulse response decaying coefficient $\rho_b(l)$ in the residual echo suppressor (RES) of FIG. 4.

The algorithm according to this exemplary embodiment shown in FIG. 6 provides a result in one cycle over samples of $\hat{h}_b$ (n), and may be more convenient in practice than that of FIG. 3.

Referring to FIGS. 5 and 6, the algorithm of FIG. 6 is to find a maximal absolute value $H_{max}$ 51 of the impulse response $\hat{h}_b(n)$ in a beginning portion of the impulse response, and then to find the corresponding local maximum $H_{min}$ at a decaying tail of an absolute value of the impulse response $|\hat{h}_b(n)|$. In other words, this algorithm finds the highest local maximum at the end of the impulse response (IR).

These two values $H_{max}$ and $H_{min}$ satisfy the following Formula 3 using an exponential function.

$$H_{min} = H_{max} \exp\left\{-\rho_b \frac{i_{min} - i_{max}}{f_{sb}}\right\} \quad \text{[Formula 3]}$$

where, $i_{min}$ and $i_{max}$ denote indexes of $H_{min}$ and $H_{max}$ respectively.

As shown in FIG. 5, the global maximum $H_{max}$ of an impulse response module corresponding to the curve $|\hat{h}_b(n)|$ is found. In addition, the following two conditions have to be satisfied to obtain $H_{min}$.

1) It has to be a local maximum.

2) In the vicinity there can be other local maximums, which are less than a desired one.

These conditions are based on an observation that the impulse responses generally have decaying repetitions of some initial patterns.

The foregoing algorithm for estimating the sub-band impulse response (IR) decaying coefficient according to the exemplary embodiment shown in FIG. 6 operates as follows.

Operation S0. Initialization is performed. For example, initialize $L_{search}=L_b/D$, where D is an integer value. Initialize: $H_{max}$=Max$_1$=Max$_2$=−1; $i_1=i_2=i_{max}$=0; i=0; m=0.

Operation S10. If (i==L$_b$−1), then go to Operation S80.

Operation S20. If ($|\hat{h}_b(i)|$>H$_{max}$), then: H$_{max}$=$|\hat{h}_b(i)|$; $i_{max}=i_1$=i; m=0; Max$_1$=Max$_2$=−1; go to Operation S70.

Operation S30. If ($|\hat{h}_b(i)|$≤$|\hat{h}_b(i-1)|$ or $|\hat{h}_b(i)|$<$|\hat{h}_b(i+1)|$), then: m=m+1; go to Operation S70.

Operation S40. If ($|\hat{h}_b(i)|$>Max$_1$), then: Max$_1$=$|\hat{h}_b(i)|$; $i_1$=i; Max$_2$=−1; m=0; go to Operation S70.

Operation S50. If ($|\hat{h}_b(i)|$>Max$_2$), then: Max$_2$=$|\hat{h}_b(i)|$; $i_2$=i; m=m+1.

Operation S60. If (m≥L$_{search}$), then: m=0; Max$_1$=Max$_2$; $i_1=i_2$; Max$_2$=−1.

Operation S70. i=i+1. Go to Operation S10.

Operation S80. Return: $\rho_b=f_{sb}\cdot\ln(H_{max}/Max_1)/(i_1-i_{max})$, where $f_{sb}$ is a sampling frequency in a band b, which, due to down-sampling, is M times less than the input signal sampling frequency.

As shown in FIG. 6 and the foregoing algorithm, in the Operation S0, initialization is performed with $L_{search}=L_b$ D, where D is an integer value. Further, initialization is performed with $H_{max}$=Max$_1$=Max$_2$=−1; $i_1=i_2=i_{max}$=0; i=0; m=0.

Here, $L_{search}$ is to divide $\hat{h}_b$ (n) estimated with regard to each sub-band into a number of search windows. The number of search windows may be predetermined. For example, at $L_b$=256 or $L_b$=64, good results are obtained with D=8. That is, $L_b$ may correspond to a domain to be analyzed, as a length of the impulse response $\hat{h}_b$ (n) of each sub-band.

On the assumption that $H_{max}$ and its index $i_{max}$ are invariables, the maximal absolute value of $\hat{h}_b$ (n) is found. The indexes $i_1$ and $i_2$ corresponding to the variables Max$_1$ and Max$_2$ are used for searching the local maximums of $\hat{h}_b$ (n) after $H_{max}$. The initial value for the variables $H_{max}$, Max$_1$ and Max$_2$ is "−1" since the initial value should be smaller than any positive or zero number. The variable i is used for an index sample of the impulse response. The variable m is used for tracking a certain search window.

Next, in the Operation S10, i and $L_b$ are compared. If i<$L_b$, the Operation S20 starts. If i==$L_b$−1, the Operation S80 directly starts.

That is, if the end of the impulse response $\hat{h}_b$ (n) as shown in FIG. 5 is reached once in the Operation S10, the result may be calculated by jumping to the Operation S80. Otherwise, the Operation S20 starts. For example, if the Operation S10 starts directly after the initialization is performed with i=0 in the operation S0, the Operation S20 starts in accordance with determination results in the Operation S10.

In the Operation S20, $|\hat{h}_b(i)|$ and $H_{max}$ are compared. If $|\hat{h}_b(i)|>H_{max}$, the Operation S21 starts to perform updating with $H_{max}=|\hat{h}_b(i)|$ and resetting with $i_{max}=i_1=i$; m=0; $Max_1=Max_2=-1$, and then proceeds to the Operation S70. In the Operation S20, if $|\hat{h}_b(i)|\leq H_{max}$, the Operation S30 starts.

The Operation S20 is to search for $H_{max}$. If this operation is performed once, the Operation S20 is skipped in accordance with checked states, and the present algorithm performs the following steps to search for some local maximum corresponding to $H_{max}$ for each $|\hat{h}_b(i)|$. That is, the Operation S30 directly follows the Operation S20 after determining $H_{max}$ in the beginning of the impulse response shown in FIG. 5.

In the Operation S30, it is determined whether there is the local maximum of $|\hat{h}_b(i)|$. Specifically, comparison is performed between $|\hat{h}_b(i)|$ and $|\hat{h}_b(i-1)|$ and between $|\hat{h}_b(i)|$ and $|\hat{h}_b(i+1)|$. As a result of the comparison, if $(|\hat{h}_b(i)|\leq|\hat{h}_b(i-1)|$ or $|\hat{h}_b(i)|<|\hat{h}_b(i+1)|)$, the Operation S31 starts to get m=m+1 (i.e., m++), and proceeds to the Operation S70. That is, if $|\hat{h}_b(i)|$ is not the local maximum, the operations for searching the local maximum are performed with regard to the next $|\hat{h}_b(i)|$ by increasing the index m by 1 in the corresponding search window at the Operation S31 and increasing the index i by 1 at the Operation S70.

If the local maximum is found as the comparison result in the Operation S30, e.g., if $|\hat{h}_b(i)|>|\hat{h}_b(i-1)|$ or $|\hat{h}_b(i)|\geq|\hat{h}_b(i+1)|$, the Operation S40 may start.

In the Operation S40, $|\hat{h}_b(i)|$ and $Max_1$ are compared. if $|\hat{h}_b(i)|>Max_1$, the Operation S41 starts to perform updating with $Max_1=|\hat{h}_b(i)|$ and resetting with $i_1=i$; $Max_2=-1$; m=0 and proceeds to the Operation S70.

That is, if it is determined in the previous Operation S30 that $|\hat{h}_b(i)|$ is the local maximum, it is checked whether or not $|\hat{h}_b(i)|$ is higher than the previous value of $Max_1$. As a checking result, if $|\hat{h}_b(i)|$ is higher than $Max_1$, $Max_1$ and its index i are updated, and $Max_2$ and m are reset.

In practice, $Max_1$ is to store a value of a global maximum found in the local search interval (window), whereas $Max_2$ is to search this global-on-interval local maximum.

The reason is as follows. If $Max_1$ is updated, $Max_2$ is not needed in the current search window and thus the next Operation S50 is skipped. Since $Max_2$ is also unnecessary in the search window of the Operation S50, m is reset and the Operation S60 is skipped. Resetting of m in this operation means that a new search window starts directly after a new value of $Max_1$.

In other words, this algorithm stores $H_{max}$ as $Max_1$ when $H_{max}$ is determined in the corresponding search window, and continues to perform the operations of the Operations S10 to S40 corresponding to the respective conditions with respect to the next window without performing the operations following the Operation S50 for determining the local maximum $H_{min}$ in the corresponding search window.

On the other hand, if $|\hat{h}_b(i)|$ is equal to or lower than $Max_1$ in the Operation S40, the Operation S50 starts to search the local maximum in the corresponding search window.

In the Operation S50, $|\hat{h}_b(i)|$ and $Max_2$ are compared. If $|\hat{h}_b(i)|>Max_2$, the Operation S51 starts to perform updating with $Max_2=|\hat{h}_b(i)|$ and resetting with $i_2=i$; m=m+1(m++) and proceeds to the Operation S60.

The move from the Operation S50 to the Operation S51 means that $|\hat{h}_b(i)|$ corresponds to the local maximum and is lower than $Max_1$. If $|\hat{h}_b(i)|$ is higher than the previous value of $Max_2$, $Max_2$ and its index $i_2$ have to be properly updated. This is a procedure of searching the global maximum within the bounded search window.

On the other hand, if $|\hat{h}_b(i)|\leq Max_2$, the Operation S50 proceeds to the Operation S60. In the Operation S60, m and $L_{search}$ are compared. As a comparison result, if $m\geq L_{search}$, the Operation S61 starts to have m=0, $Max_1=Max_2$, $i_1=i_2$, $Max_2=-1$.

That is, in the next search window, a value of $Max_2$ is stored in $Max_1$ so that $Max_2$ can be freely variable for the following search.

The Operation S70 increases i by i=i+1(i++) and proceeds to the Operation S10, which means an increase in an index of an impulse response array.

If the increase in the Operation S70 satisfies $i=L_b-1$ in the Operation S10, the Operation S80 starts.

In the Operation S80, $\rho_b$ is returned by the following Formula 4.

$$\rho_b = f_{sb} \cdot \ln(H_{max}/Max_1)/(i_1-i_{max}) \quad \text{[Formula 4]}$$

where, $f_{sb}$ denotes a sampling frequency in a band b, which is M times less than the input signal sampling frequency due to down-sampling.

In the Operation S80, $Max_1$ and $i_1$ are used as $H_{min}$ and $i_{min}$, respectively, in the formula written prior to the steps of this algorithm.

As shown in FIG. 6, the Operation S70 starts to increase i and proceeds to the Operation S10 after updating/resetting $Max_1$, $Max_2$ and m in the Operation S21, S31, S41 and S61.

The foregoing algorithm is performed by the RES 420 with regard to each sub-band based on information received from the AEC 140. That is, the algorithm determines the maximum coefficient $H_{max}$ and the local maximum $H_{min}$ by updating $Max_1$ and $Max_2$ while increasing i and m in response to conditions of the respective operations with respect to the search windows $L_{search}$ divided from $|\hat{h}_b(i)|$ corresponding to a sub-band, and determines a decaying coefficient $\rho_b$ of the impulse response with regard to each sub-band by applying the determined values to the Formula 4. The sub-band may be predetermined.

The decaying coefficient $\rho_b$ is a slope of a straight line corresponding to the logarithm of the square of the absolute magnitude of the impulse responses shown in FIG. 5.

In the foregoing algorithm shown in FIG. 6, a computational complexity (i.e., the number of mathematical operations) is less than that in the calculation approach for T60(l, k) provided in the exemplary embodiment of FIG. 3.

If $\rho_b$ is calculated as described above, its value is assigned to $\rho(l, k)$ for the current signal frame l and each frequency domain index k corresponding to the bth sub-band of the processed IR $\hat{h}_b(n)$.

Initial power c(l, k) of the residual echo is estimated by the following Formula using a sub-band IR $\hat{h}_b(n)$.

$$c_b = \exp\left\{-\frac{2\rho_b N_w}{f_{sb}}\right\} \sum_{j=0}^{N_w-1} \hat{h}_b^2(L_b - N_w + j). \quad \text{[Formula 5]}$$

where, Cb denotes the initial power in the corresponding sub-band, $\rho_b$ denotes the decaying coefficient of the sub-band impulse response, $L_b$ denotes the length of the sub-band impulse response, and $N_w$ denotes the length of the decaying tail of the sub-band impulse response $\hat{h}_b(n)$.

That is, Cb is a value obtained by covering the tail of each sub-band impulse response with an energy decay curve, and corresponds to an initial power estimation value at the tail of the impulse response under an actual environment (not shown) in the impulse response signal shown in FIG. 5 due to a finite number of taps.

In the case of using the Formula 5, calculation is performed once per sub-band in order to estimate the initial power, and is thus less in complexity than that using the Formula 2 in the exemplary embodiment of FIG. 3. Further, the values of the initial power of the residual echo are simply retrieved as c(l, k)=cb/Nf.

Here, Nf denotes a number of indexes k corresponding to a bth sub-band. The index k refers to a frequency index of Fourier transform. If Fourier transform is performed with regard to N sampling signals, it is possible to obtain N frequency components and the indexes from 1 to N correspond to a frequency band obtained by dividing the Nyquist frequency from zero by N.

According to an exemplary embodiment, the residual echo suppressor (RES) 420 calculates the initial power Cb of each sub-band through the foregoing Formula 5, and estimates the residual echo corresponding to the final residual echo section corresponding to the tail (not shown) of the impulse response of FIG. 5 through the calculated initial power Cb and decaying coefficient $\rho_b$.

Using the estimated residual echo, the secondary echo-cancellation is performed to remove the residual echo from the full-band input signal. At this time, the residual echo suppressor 420 generates the full-band residual echo signal based on the residual echo estimated for each sub-band, and receives the primary echo-cancelled signal from the acoustic echo canceler 410. Then, the secondary echo-cancellation is performed in such a manner that the full-band residual echo signal is removed from the received signal that has experienced the primary echo-cancellation.

The present inventive concept may be applied to a stereo or multi-channel AEC system that includes two near-end speakers. As the number of speakers becomes greater, the computational complexity grows almost linearly.

In de-reverberation systems after the AEC, where estimation of a reverberation time T60 is performed, the foregoing algorithm can be used for average T60 estimation in the full-band, given an impulse response of an environment of interest.

The foregoing RES according to an exemplary embodiment reduces RES complexity to thereby improve performance of a multi-reference AEC system for a smart TV. AEC algorithms, optimized in sense of performance and computational complexity, can be implemented by less expensive audio processing chips, thus saving money. At the same time, the algorithms allow faster reaction on a customer's problem.

As described above, according to an exemplary embodiment, an echo signal is easily and effectively removed from an input signal received in a microphone by primary echo-cancellation (i.e. the acoustic echo cancellation of the acoustic echo canceller (AEC)) and secondary echo-cancellation (i.e. the residual echo suppression of the residual echo suppressor (REC)), thereby improving performance of acoustic echo suppression in a frequency domain.

In addition, the secondary echo-cancellation employs information obtained in the primary echo-cancellation to decrease the computational complexity and memory usage and improve processing speed, thereby enhancing a user's convenience.

The foregoing exemplary embodiments may be implemented by a program stored on a computer-readable recording medium. The computer-readable recording medium includes a transmission medium and a storage medium for storing data readable by a computer system. The transmission medium may be a wired/wireless network where computer systems are connected to one another.

The foregoing exemplary embodiments may be implemented by hardware or by a combination of hardware and software. The hardware including the AEC/RES includes a nonvolatile memory where software, i.e. a computer program is stored; a random access memory (RAM) to which the computer program stored in the nonvolatile memory is loaded; and at least one processor for executing the computer program loaded to the RAM. The processor may be a microprocessor, a microcontroller, or the like. The nonvolatile memory may include a hard disk drive, a flash memory, a read only memory (ROM), compact disc (CD)-ROMs, magnetic tapes, a floppy disk, an optical storage, a data transmission device using Internet, etc., but not limited thereto. The nonvolatile memory is an example of the computer-readable recording medium in which a program readable by a computer is recorded.

The computer program is code that can be read and executed by the processor, and includes codes for enabling the processor provided as the AEC or RES in the apparatus to perform operations.

The computer program may be involved in software including an operating system or applications provided in the display apparatus and/or software interfacing with the external apparatus.

Although a few exemplary embodiments have been shown and described, it will be appreciated by those skilled in the art that changes may be made in these exemplary embodiments without departing from the principles and spirit of the inventive concept, the scope of which is defined in the appended claims and their equivalents.

What is claimed is:

1. A display apparatus comprising:
    a display configured to display an image;
    a signal receiver configured to receive an input signal; and
    at least one processor configured to:
        divide the input signal of an impulse response into a plurality of sub-bands,
        apply primary echo-cancellation to the input signal by using a plurality of sub-band signals corresponding to the plurality of sub-bands,
        obtain acoustic echo path information according to the primary echo-cancellation with regard to each of the plurality of sub-bands,
        determine a decaying coefficient of an impulse response corresponding to each of the plurality of sub-bands based on the acoustic echo path information obtained for the sub-bands,
        estimate a residual echo using the decaying coefficient of the impulse response corresponding to each of the plurality of sub-bands, and
        perform secondary echo-cancellation to remove the estimated residual echo from the primary-echo-canceled input signal.

2. The display apparatus according to claim 1, wherein the at least one processor comprises:
    an acoustic echo canceler configured to perform the primary echo-cancellation to obtain the acoustic echo path information; and
    a residual echo suppressor configured to determine the decaying coefficient of the impulse response corresponding to each of the plurality of sub-bands and perform the secondary echo-cancellation using the decaying coefficient of the impulse response corresponding to each of the plurality of sub-bands.

3. The display apparatus according to claim 1, wherein the at least one processor is configured determine a maximum of the impulse response and a local maximum at a decaying tail of the impulse response for each sub-band, and determine the decaying coefficient based on the determined maximum and local maximum.

4. The display apparatus according to claim 3, wherein the at least one processor is configured to determine the maximum and local maximum for each sub-band by dividing the impulse response corresponding to each sub-band into a plurality of search windows and updating the maximum or the local maximum while increasing an index with regard to each divided search window.

5. The display apparatus according to claim 4, wherein the at least one processor is configured to skip a procedure for determining the local maximum in a corresponding search window if the maximum is determined in a beginning of the impulse response, and update the local maximum in a next search window.

6. The display apparatus according to claim 4, wherein the decaying coefficient is determined by:

$$\rho_b = f_{sb} \cdot \ln(H_{max}/\text{Max}_1)/(i_1 - i_{max}),$$

where $\rho_b$ denotes the decaying coefficient, $H_{max}$ denotes a maximum of the impulse response, $i_{max}$ denotes an index of $H_{max}$, $\text{Max}_1$ denotes an ultimately updated local maximum, $i_1$ denotes an index of the local maximum, and $f_{sb}$ denotes a sampling frequency due to down-sampling of the impulse response.

7. The display apparatus according to claim 1, wherein the at least one processor is configured to estimate initial power in a final residual echo section of the impulse response corresponding to each of the plurality of sub-bands, which has experienced the primary echo-cancellation, based on the decaying coefficient.

8. The display apparatus according to claim 7, wherein the initial power in each of the plurality of sub-bands is determined by:

$$c_b = \exp\left\{-\frac{2\rho_b N_w}{f_{sb}}\right\} \sum_{j=0}^{N_w-1} \hat{h}_b^2(L_b - N_w + j),$$

where $C_b$ denotes initial power, $\rho_b$ denotes a decaying coefficient of a sub-band impulse response, $L_b$ denotes a length of the sub-band impulse response, $N_w$ denotes a length of a decaying tail of the sub-band impulse response, $f_{sb}$ denotes a sampling frequency due to a down-sampling of an impulse response, and $\hat{h}_b(n)$ denotes the sub-band impulse response.

9. The display apparatus according to claim 2, wherein the residual echo suppressor is configured to estimate an acoustic echo path by applying adaptive filtration to each of the plurality of sub-bands, estimate an echo by convolving the estimated acoustic echo path for the sub-bands with a speaker signal, and remove a full-band echo signal synthesized with an echo estimated for the sub-bands from the input signal.

10. An echo cancellation method of a display apparatus, the method comprising:
receiving an input signal of an impulse response;
dividing the input signal of the impulse response into a plurality of sub-bands;
applying primary echo-cancellation to the input signal by using a plurality of sub-band signals corresponding to the plurality of sub-bands;
obtaining acoustic echo path information according to the primary echo-cancellation with regard to each of the plurality of sub-bands;
determining a decaying coefficient of an impulse response corresponding to each of the plurality of sub-bands based on the acoustic echo path information obtained for the sub-bands;
estimating a residual echo using the decaying coefficient of the impulse response corresponding to each of the plurality of sub-bands; and
performing secondary echo-cancellation to remove the estimated residual echo from the primary-echo-canceled input signal.

11. The echo cancellation method according to claim 10, wherein the performing the secondary echo-cancellation comprises determining a maximum of the impulse response and a local maximum at a decaying tail of the impulse response for each sub-band, and determining the decaying coefficient based on the determined maximum and local maximum.

12. The echo cancellation method according to claim 11, wherein the maximum and local maximum is determined for each sub-band by dividing the impulse response corresponding to each sub-band into a plurality of search windows and updating the maximum or the local maximum while increasing an index with regard to each divided search window.

13. The echo cancellation method according to claim 12, wherein the performing the secondary echo-cancellation comprises:
skipping a procedure for determining the local maximum in a corresponding search window if the maximum is determined in a beginning of the impulse response; and
updating the local maximum in a next search window.

14. The echo cancellation method according to claim 12, wherein the decaying coefficient is determined by:

$$\rho_b = f_{sb} \cdot \ln(H_{max}/\text{Max}_1)/(i_1 - i_{max}),$$

where $\rho_b$ denotes the decaying coefficient, $H_{max}$ denotes a maximum of the impulse response, $i_{max}$ denotes an index of $H_{max}$, $\text{Max}_1$ denotes an ultimately updated local maximum, $i_1$ denotes an index of the local maximum, and $f_{sb}$ denotes a sampling frequency due to down-sampling of the impulse response.

15. The echo cancellation method according to claim 10, wherein the performing the secondary echo-cancellation comprises estimating initial power in a final residual echo section of the impulse response corresponding to each of the plurality of sub-bands, which has experienced the primary echo-cancellation, based on the decaying coefficient.

16. The echo cancellation method according to claim 15, wherein the initial power in each of the plurality of sub-bands is determined by:

$$c_b = \exp\left\{-\frac{2\rho_b N_w}{f_{sb}}\right\} \sum_{j=0}^{N_w-1} \hat{h}_b^2(L_b - N_w + j),$$

where $C_b$ denotes initial power, $\rho_b$ denotes a decaying coefficient of a sub-band impulse response, $L_b$ denotes a length of the sub-band impulse response, $N_w$ denotes a length of a decaying tail of the sub-band impulse response, $f_{sb}$ denotes a sampling frequency due to a down-sampling of the impulse response, and $\hat{h}_b(n)$ denotes the sub-band impulse response.

17. The echo cancellation method according to claim 10, wherein the applying the primary echo-cancellation comprises:
   estimating an acoustic echo path by applying adaptive filtration to each of the plurality of sub-bands;
   estimating an echo by convolving the estimated acoustic echo path for the sub-bands with a speaker signal; and
   removing a full-band echo signal synthesized with an echo estimated for the sub-bands from the input signal.

* * * * *